(12) United States Patent
Nilsson

(10) Patent No.: US 9,472,105 B2
(45) Date of Patent: Oct. 18, 2016

(54) LANE MARKING CROSSING WARNING SYSTEM

(75) Inventor: Benny Nilsson, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/397,746

(22) PCT Filed: May 8, 2012

(86) PCT No.: PCT/SE2012/050485
§ 371 (c)(1),
(2), (4) Date: Oct. 29, 2014

(87) PCT Pub. No.: WO2013/169153
PCT Pub. Date: Nov. 14, 2013

(65) Prior Publication Data
US 2015/0097661 A1    Apr. 9, 2015

(51) Int. Cl.
| | | |
|---|---|---|
| B60Q 1/00 | (2006.01) | |
| G08G 1/16 | (2006.01) | |
| B62D 15/02 | (2006.01) | |
| B60W 50/14 | (2012.01) | |

(52) U.S. Cl.
CPC .............. G08G 1/167 (2013.01); B62D 15/029 (2013.01); *B60W 50/14* (2013.01); *B60W 2520/14* (2013.01); *B60W 2540/18* (2013.01); *B60W 2550/146* (2013.01)

(58) Field of Classification Search
CPC .... G08G 1/167; B60Q 9/008; B62D 15/025; B62D 15/029; B60T 2201/08; B60T 2201/082; B60T 2201/087; B60T 8/17557; B60W 30/12; B60W 50/14; G06K 9/00798; G01S 13/931; B60R 2300/302
USPC .......... 340/439, 435, 901, 905; 701/301, 400
See application file for complete search history.

(56) References Cited

U.S. PATENT DOCUMENTS

| | | |
|---|---|---|
| 7,561,032 B2 | 7/2009 | Huang et al. |
| 2005/0273264 A1 | 12/2005 | Gern et al. |
| 2007/0225914 A1 | 9/2007 | Kawazoe et al. |
| 2011/0231063 A1 | 9/2011 | Kim |

FOREIGN PATENT DOCUMENTS

| | | |
|---|---|---|
| DE | 10 2010 032 063 A1 | 5/2011 |
| EP | 2 272 723 A1 | 12/2011 |
| WO | WO 2006/037445 A1 | 4/2006 |

OTHER PUBLICATIONS

International Search Report—Jan. 28, 2013, (PCT/SE2012/050485).

*Primary Examiner* — Thomas Mullen
(74) *Attorney, Agent, or Firm* — Brinks Gilson & Lione

(57) ABSTRACT

A lane marking crossing warning system for a vehicle includes a sensor arrangement arranged to detect at least one lane marking line that defines a corresponding lane boundary, a control unit arranged to determine if the vehicle has entered a curve, and a warning device arranged to issue a warning. When the control unit has determined that the vehicle has entered a curve, the control unit is arranged to determine if an imaginary sensor line running a certain distance from the lane marking line has been crossed by the vehicle. If that is the case, the control unit is arranged to determine that a warning is to be issued by the warning device.

15 Claims, 6 Drawing Sheets

LANE MARKING CROSSING WARNING SYSTEM

CROSS REFERENCE TO RELATED APPLICATIONS

This application relates to PCT International Patent Application No. PCT/SE2012/050485, filed on May 8, 2012.

FIELD OF THE INVENTION

The present invention relates to a lane marking crossing warning system for a vehicle. The warning system including:
a sensor arrangement arranged to detect at least one lane marking line that defines a corresponding lane boundary,
a control unit arranged to determine if the vehicle has entered a curve, and
warning means, arranged to issue a warning.

The present invention also relates to a method for lane marking crossing warning in a vehicle, where the method includes the steps:
detecting at least one lane marking line, and determining if the vehicle is travelling in a curve.

BACKGROUND

Lane departure warning and avoidance (LDW) systems have been developed to aid vehicle drivers in maintaining proper lane alignment by providing a warning if lane markings are crossed, some LDW systems provide timely warnings prior to crossing of lane markings.

Present LDW systems typically utilize radars, digital maps, camera/video processing sensors or other suitable sensor arrangement to detect lane markings that define a lane boundary. The detected lane markings determine the lateral position of a vehicle in a lane. Present LDW systems further usually have an analyzer for analyzing the crossing of lane markings, and suitable means for warning a driver of lane departure as necessary. An estimated time for lane crossing may be determined, and when this time falls below a predefined threshold, a warning is typically issued.

However, in order to obtain a comfortable and efficient driving of a vehicle, it is often desired to cross lane marking in a curve if possible due to the traffic situation, reducing the curvature of the vehicle's path. In this case warnings from an LDW system would constitute non-relevant warnings that unnecessarily distract the driver.

The documents U.S. Pat. No. 7,561,032 and US Publication No. 2005/273264 describe LDW systems that adapt to different styles of driving, and suppress warnings when found appropriate. However, it is desired that a higher degree of safety is obtained, while maintaining the possibility to reduce the curvature of the vehicle's path without receiving unnecessary warnings.

It is therefore an object of the present invention to provide a device for warning a driver in the event of expected or occurred lane marking crossing, which allows driving safety to be improved and at the same time the number of unnecessary warnings to be minimized.

The object is achieved by means of a lane marking crossing warning system for a vehicle in accordance with this invention. The warning system described herein includes:
a sensor arrangement arranged to detect at least one lane marking line that defines a corresponding lane boundary;
a control unit arranged to determine if the vehicle has entered a curve; and
warning means, arranged to issue a warning.

When the control unit has determined that the vehicle has entered a curve, the control unit is arranged to determine if an imaginary sensor line running a certain distance from the lane marking line has been crossed by the vehicle. In that case, the control unit is furthermore arranged determine that a warning is to be issued by the warning means.

The above object is also achieved by means of a method for lane marking crossing warning in a vehicle, where the method includes the steps:
detecting at least one lane marking line, determining if the vehicle is travelling in a curve and, if the vehicle has been determined to travel in a curve, issuing a warning to a vehicle driver if an imaginary sensor line, running a certain distance from said lane marking line, is crossed by the vehicle.

According to an example embodiment of the invention, each sensor arrangement includes a camera device.

According to another example embodiment, the control unit arranged to determine if the vehicle has entered a curve based on input from:
the sensor arrangement and/or
a steering wheel angle sensor and/or
a vehicle yaw sensor and/or
a digital map system.

According to another example embodiment, when the control unit has determined that the vehicle has entered a curve, the control unit is further arranged to move each sensor line, from coinciding with said lane marking line, to running said certain distance from said lane marking line.

According to another example embodiment, for a curve turning to the left with regard to a vehicle travelling direction, the control unit is arranged to move at least one sensor line to the left. Correspondingly, for a curve turning to the right with regard to the vehicle travelling direction, the control unit is arranged to move at least one sensor line to the right.

Other examples are disclosed herein.

A number of advantages are obtained by means of the present invention. Mainly, a lane marking crossing warning system is provided, which system allows driving safety to be improved while the number of unnecessary warnings is minimized.

BRIEF DESCRIPTION OF THE DRAWINGS

The present invention will now be described more in detail with reference to the appended drawings, where.

DETAILED DESCRIPTION

Figure 1:
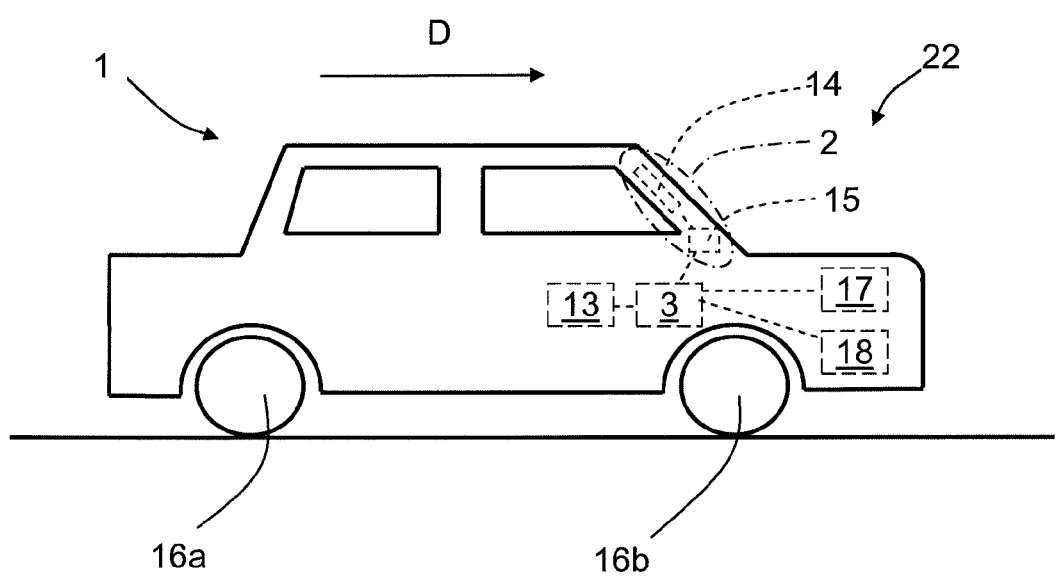
FIG. 1 shows a schematical side view of a vehicle equipped with a lane-marking crossing warning system warning system according to the present invention.

With reference to FIG. 1, showing a side view of a vehicle 1, the vehicle 1 includes a sensor arrangement 2 arranged to detect road lane marking lines that define a lane boundary and a control unit 3 arranged to determine if a warning is to be issued, and if so, issues such a warning. The warning may for example be in the form of a displayed message and/or a sound or voice message as well as vibrations created for a steering wheel, and generally the warning is issued or created by means of warning means 13. As shown in FIG. 1, the sensor arrangement 2 is connected to the control unit 3, which in turn is connected to the warning means 13.

Figure 2:
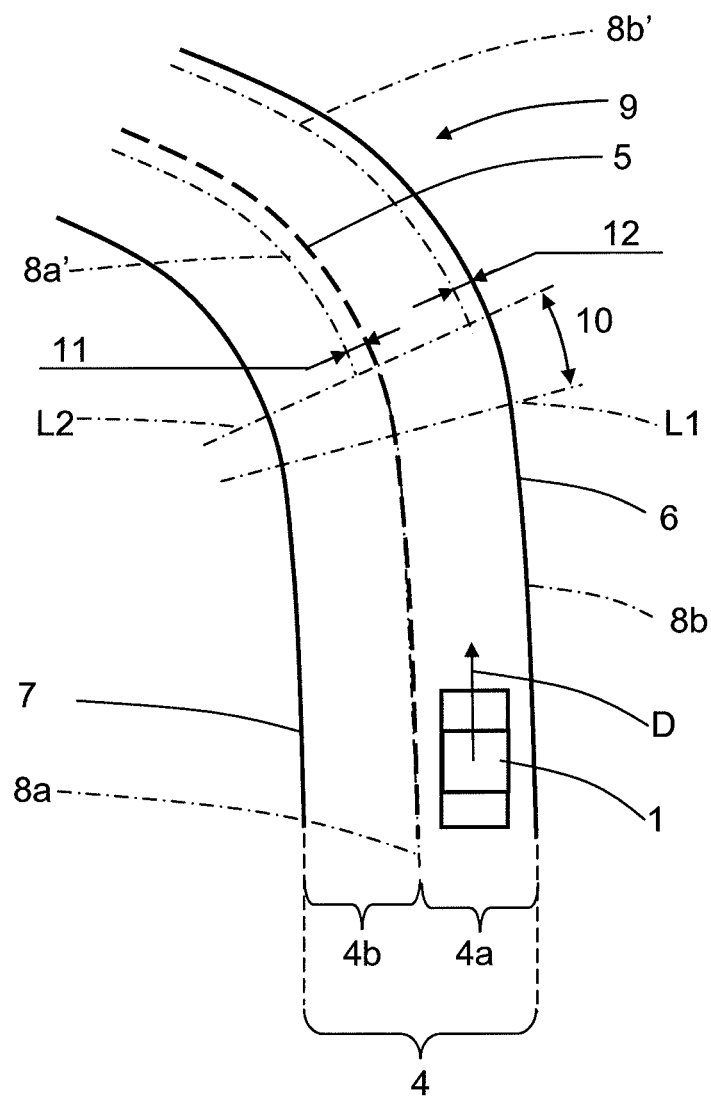
FIG. 2 shows a schematical top view of a vehicle equipped with a lane marking crossing warning system warning system according to the present invention in a first example entering, a curve turning to the left.

FIG. 2 shows a first example, where the vehicle 1 is moving in a direction D along a road 4 with two lanes 4a, 4b separated with lane marking lines in the form of a dashed line 5. The road's outer boundaries are marked with lane marking lines in the form of a first solid line 6 and a second solid line 7, the vehicle 1 being shown travelling in a first lane 4a between the dashed line 5 and the first solid line 6. The control unit 3 issues a warning if a first sensor line 8a or a second sensor line 8b is crossed. The sensor lines 8a, 8b are indicated with dash-dotted lines, only being imaginary and used by the control unit 3 only. At the travelling position shown for the vehicle 1, the first sensor line 8a coincides with the dashed line 5 and the second sensor line 8b coincides with the first solid line 6. The second sensor line 8b is thus not visible in FIG. 2 since it coincides with the first solid line 6.

Ahead of the vehicle in its travelling direction D there is a curve 9 that turns to the left. When the vehicle approaches the curve 9, the steering is moved to a position first indicated with a first line L1. When the vehicle 1 has travelled a certain time t that corresponds to a first distance 10, a certain second position indicated with a second line L2 is reached. At the second line L2, the control unit 3 determines that the vehicle 1 is travelling in a curve.

According to the present invention, when the control unit 3 has determined that the vehicle 1 is travelling in a curve, the control unit 3 moves the first sensor line 8a and the second sensor line 8b such that a moved first sensor line 8a' and a moved second sensor line 8b' are formed. The moved first sensor line 8a' has been moved, away from the first solid line 6, such that it follows the shape of the dashed line 5 a certain first line distance 11 from the dashed line 5. The moved second sensor line 8b' has been moved, towards the dashed line 5, such that it follows the shape of the first solid line 6 a certain second line distance 12 from the first solid line 6.

Since the first sensor line 8a has been moved, the vehicle 1 may cross the dashed line 5 without any warning being issued; the warning still being issued if the moved first sensor line 8a' is crossed.

On the other hand, the second sensor line 8b has been moved towards the dashed line 5, a warning being issued if the moved second sensor line 8b' is crossed, which occurs before the first solid line 6 is crossed. In this way, a warning is issued if the vehicle 1 comes too close to the first solid line 6, which is undesired in order to be able to pass the left-turning curve 9 in a safe manner.

The first lane 4a as defined by the sensor lines 8a, 8b has been moved to the left in the curve 9 that turns to the left. If the line distances 11, 12 are equal, the width of the first lane 4a is maintained.

Figure 3:
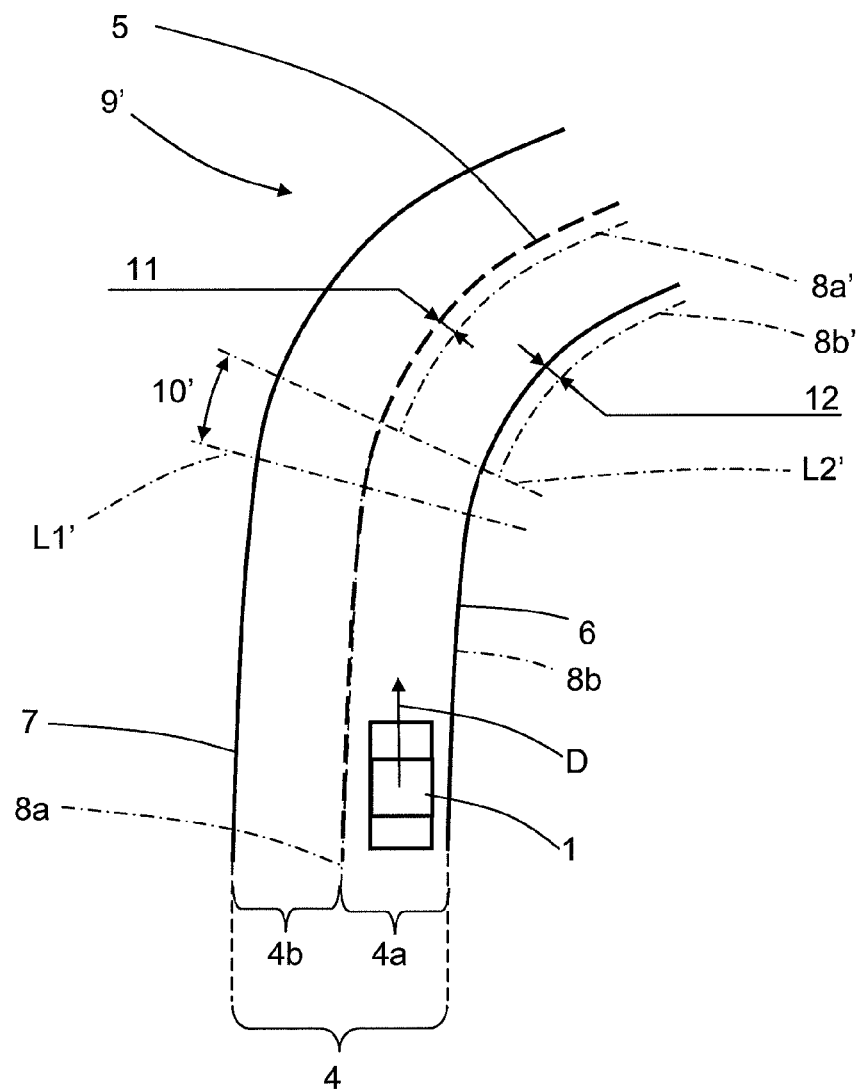
FIG. 3 shows a schematical top view of a vehicle equipped with a lane marking crossing warning system warning system according to the present invention in a second example, entering a curve turning to the right.

In FIG. 3, showing a second example, a similar situation is shown where the vehicle 1 is moving in the direction D along the road 4. As before, the vehicle 1 is shown travelling in the first lane 4a between the dashed line 5 and the first solid line 6.

Ahead of the vehicle in its travelling direction D there is a curve 9' that turns to the right. When the vehicle 1 approaches the curve 9', the steering equipment is deflected to a certain degree at a certain position first indicated with a first line L1'. When the vehicle 1 has travelled a certain time t' that corresponds to a first distance 10' without reducing the deflection, a certain second position indicated with a second line L2' is reached. At the second line L2', the control unit 3 determines that the vehicle 1 is travelling in curve.

When the control unit 3 has determined that the vehicle 1 is travelling in a curve, the control unit 3 moves the first sensor line 8a and the second sensor line 8b such that a moved first sensor line 8a' and a moved second sensor line 8b' are formed. The moved first sensor line 8a' has been moved, towards the first solid line 6, such that it follows the shape of the dashed line 5 a certain first line distance 11 from the dashed line 5. The moved second sensor line 8b' has been moved, away from the dashed line 5, such that it follows the shape of the first solid line 6 a certain second line distance 12 from the first solid line 6.

Since the first sensor line 8a has been moved, the vehicle 1 may cross the first solid line 6 without any warning being issued; the warning still being issued if the moved second sensor line 8b' is crossed.

On the other hand, the first sensor line 8a has been moved towards the first solid line 6, a warning being issued if the moved first sensor line 8a' is crossed, which occurs before the dashed line 5 is crossed. In this way, a warning is issued if the vehicle 1 comes too close to the dashed line 5, which is undesired in order to be able to pass the right-turning curve 9' in a safe manner.

The first lane 4a as defined by the sensor lines 8a, 8b has been moved to the right in the curve 9' that turns to the right. If the line distances 11, 12 are equal, the width of the first lane 4a is maintained.

Figure 4:
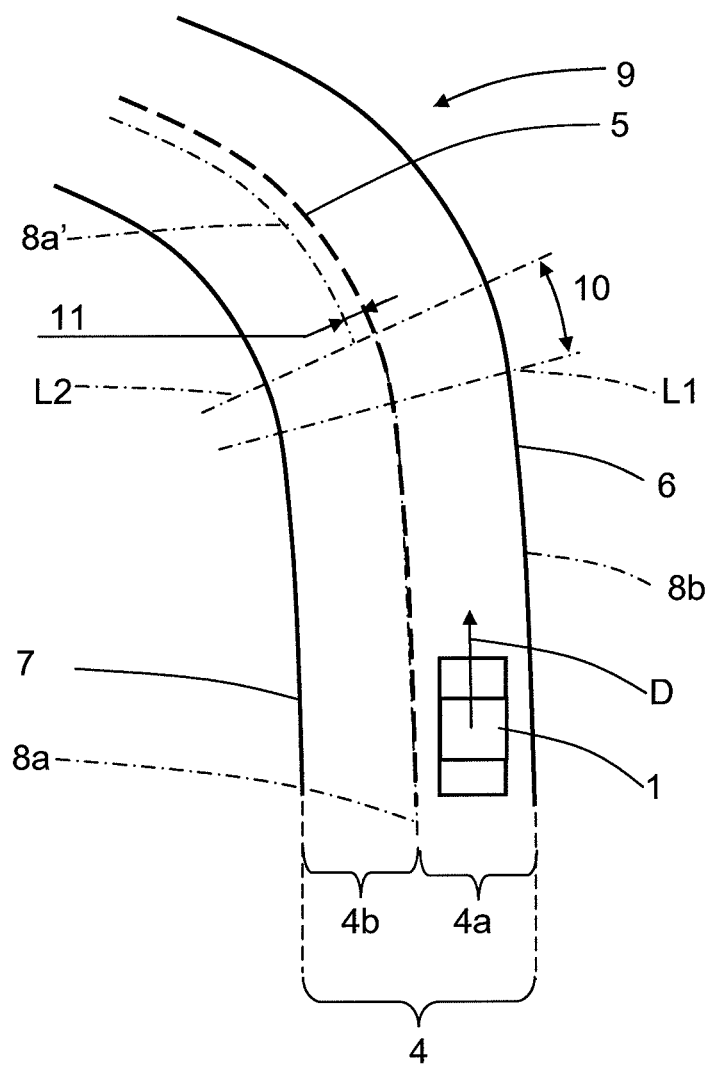
FIG. 4 shows a schematical top view of a vehicle equipped with a lane marking crossing warning system warning system according to the present invention in an alternative to the first example, entering a curve turning to the left.

With reference to FIG. 4, an alternative to the first example described previously with reference to FIG. 2 will be described. Here, the difference lies in the fact that when the control unit 3 has determined that the vehicle 1 is travelling in a curve 9 turning to the left, the control unit 3 moves only the first sensor line 8a such that a moved first sensor line 8a' is formed. The moved first sensor line 8a' has been moved, towards the first solid line 6, such that it follows the shape of the dashed line 5 a certain first line distance 11 from the dashed line 5 as in the first example. The second sensor line 8b has not been moved.

Since the second sensor line 8b has not been moved, no warning is issued until the vehicle 1 crosses the first solid line 6 or the moved first sensor line 8a'.

In this way, the first lane 4a as defined by the sensor lines 8a, 8b has been made wider, the first sensor line having been moved to the left in the curve 9 that turns to the left.

Figure 5:
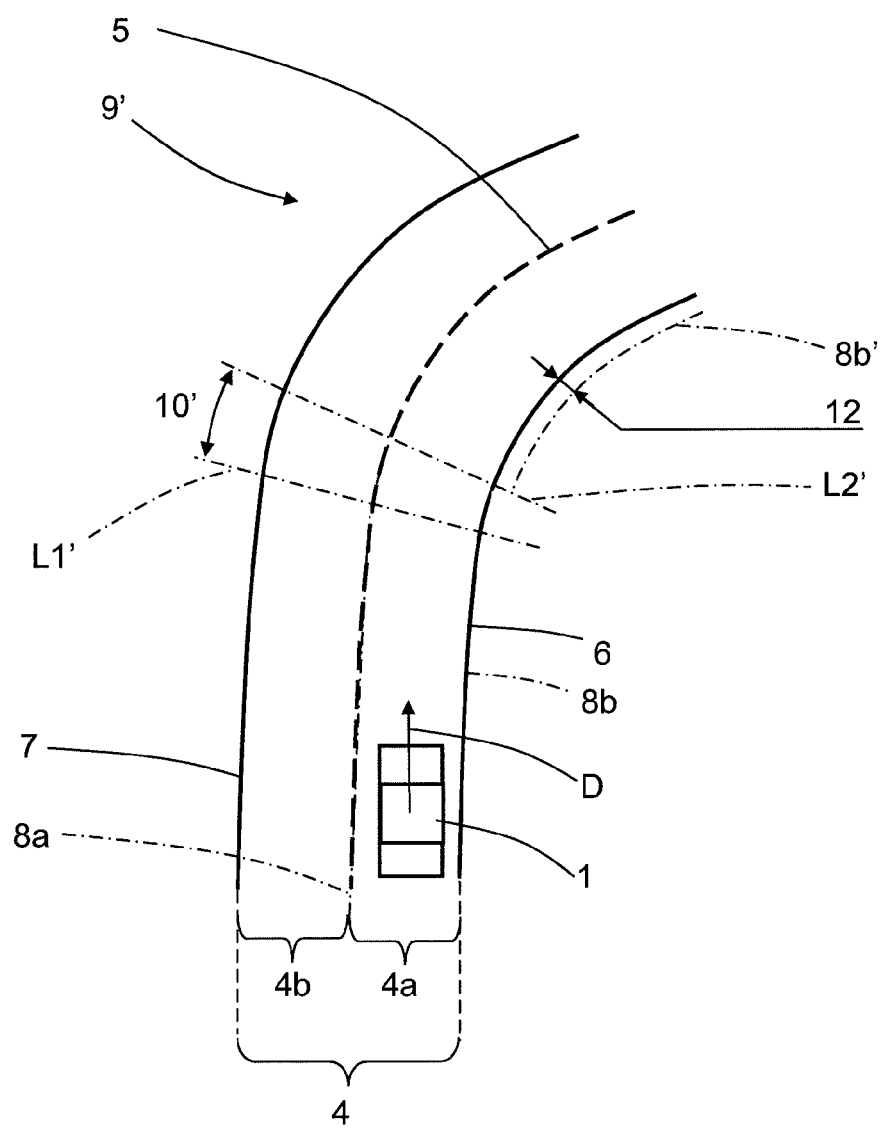
FIG. 5 shows a schematical top view of a vehicle equipped with a lane marking crossing warning system warning system according to the present invention in an alternative to the second example, entering a curve turning to the right.

With reference to FIG. 5, an alternative to the second example described previously with reference to FIG. 3 will be described. Here, the difference lies in the fact that when the control unit 3 has determined that the vehicle 1 is travelling in a curve 9' turning to the right, the control unit 3 moves only the second sensor line 8b such that a moved second sensor line 8b' is formed. The moved second sensor line 8b' has been moved away from the dashed line 5, such that it follows the shape of the first solid line 6 a certain second line distance 12 from the first solid line 6 as in the second example. The first sensor line 8a has not been moved, Since the first sensor line 8a has not been moved, no warning is issued until the vehicle 1 crosses the dashed line 5 or the moved second sensor line 8b'.

In this way, the first lane 4a as defined by the sensor lines 8a, 8b has been made wider, the second sensor line 8b having been moved to the right in the curve 9' that turns to the right.

In all examples above, those sensor lines 8a, 8b that have been moved during the curve 9, 9', are returned to coincide with the corresponding lane markings 5, 6 when the control unit 3 has determined that the vehicle 1 has left the curve 9, 9'. With reference to FIG. 1, the sensor arrangement 2 may be of many known types, for example it may have a camera device 14 and an image processing device 15, the camera device 14 being mounted at a central rear-view mirror and facing the driving direction D. A typically measure of detection range is 5 meters. In order to obtain a correct estimate of the distance between the vehicle's wheels 16a, 16b and the detected lane markings, the vehicle's width may be implemented in camera software, for example in the image processing device 15 or in the control unit 3.

The control unit 3 determines that the vehicle 1 is travelling in a curve 9, 9' at a certain position L1, L1', and there are many ways to reach such a determination. For example:

The mentioned sensor arrangement 2 may be arranged to detect road curvature as well.

A steering wheel angle sensor 17 may be used where a typical threshold can be 8° -10° during 1 second —1,5 seconds, this time corresponding to the previously mentioned time t.

A vehicle yaw sensor 18 may be used to detect that the vehicle 1 enters a curve.

A digital map system such as a GPS (Global Positioning System) may be used to detect that the vehicle 1 enters a curve.

Combinations of the above may also be implemented along with any other sensor arrangement enabling detection of the vehicle entering a curve.

In the same way it is determined when the vehicle 1 has left the curve 9, 9' in question.

The dashed line 5 and the solid lines 6, 7 are only examples of lane marking lines. Less lane marking lines or more marking lines may occur, and they have many different shapes and characters. For the present invention, at least one lane marking lane is required.

As shown in FIG. 1, the present invention relates to a lane marking crossing warning system 22 for a vehicle 1, the warning system 22 includes a sensor arrangement 2 arranged to detect at least one lane marking line 5, 6, 7, a control unit 3 and warning means 13.

Figure 6:
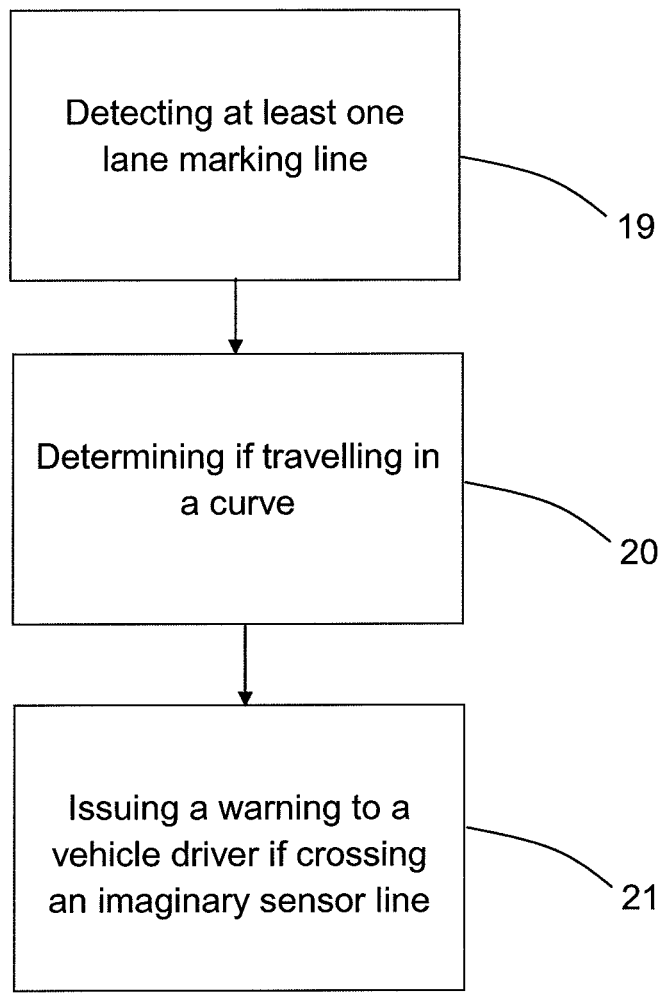
FIG. 6 shows a flowchart for a method according to the present invention.

With reference to FIG. 6, the present invention also relates to a method for providing lane marking crossing warning, the method including the steps of detecting 19 at least one lane marking line 5, 6; determining 20 if the vehicle (1) is travelling in a curve (9, 9'); and if the vehicle 1 has been determined to travel in a curve 9, 9', issuing a warning 21 to a vehicle driver if an imaginary sensor line 8a, 8b, running a certain distance 11, 12 from the lane marking line 5, 6, is crossed by the vehicle 1.

The present invention is not limited to the examples above, but may vary freely within the scope of the description. For example, the line distances 11, 12 between the lane markings 5, 6 and the corresponding sensor line 8a, 8b is about 0.1 meter to 0.3 meter.

The moving of the sensor lines 8a, 8b when the control unit 3 has determined that the vehicle 1 is travelling in a curve may be performed in one single step as shown in the previous examples, or gradually; either in several sub-steps or continuously.

It is normally desired to de-activate such a warning system in a city environment due to the usual abundant presence of curves in such an environment. It is also normally desired to de-activate such a warning system on roads with speeds over 90 km/h-100 km/h since the curves at such roads are longer with greater curvature radiuses. The warning system according to the present invention may therefore be arranged to be active in a certain speed range, for example 60 km/h-90 km/h or 50 km/h-100 km/h.

The sensor lines 8a, 8b may have no practical width, but may be constituted by mathematical lines. Alternatively, the sensor lines 8a, 8b may have a certain width. To determine if a sensor line 8a, 8b has been crossed, a wheel 16a, 16b or other vehicle part may have been determined to have reached a sensor line 8a, 8b, or may have been determined to have passed a sensor line 8a, 8b. Due to the nature of such a detection, for example the tires of the wheels 16a, 16b not being completely rigid, lane marking lines possibly being worn and/or re-painted and imperfections in calibrations, a crossing is normally not determined mathematically exact, but within what is practically obtainable.

Furthermore, there do not have to be any sensor lines that coincide with the lane marking lines 5, 6; the control unit 3 may be arranged to determine if lane marking lines have been crossed without sensor lines in this case. However, when the control unit 3 has determined that the vehicle 1 has entered a curve 9, 9', the control unit 3 is arranged to determine if an imaginary sensor line 8a, 8b running a certain distance 11, 12 from said lane marking line 5, 6 has been crossed by the vehicle 1 and in that case determine that a warning is to be issued by the warning means 13. This means that the sensor lines at least are created when the control unit 3 has determined that the vehicle 1 has entered a curve 9, 9'.

The certain time t, t' is preferably chosen such that driving maneuvers that do not relate to entering a curve do not cause the control unit 3 to erroneously determine that the vehicle 1 has entered a curve.

While the above description constitutes the preferred embodiment of the present invention, it will be appreciated that the invention is susceptible to modification, variation and change without departing from the proper scope and fair meaning of the accompanying claims.

The invention claimed is:

1. A lane-marking crossing warning system for a vehicle, the warning system comprising:
   a sensor arrangement arranged to detect a lane marking line that defines a corresponding lane boundary of a lane of a roadway the vehicle is travelling on;
   a control unit arranged to determine if the vehicle has entered a curve of the lane of the roadway the vehicle is travelling on; and
   warning means, arranged for issuing a warning; and wherein when the control unit has determined that the vehicle has entered the curve of the lane of the roadway the vehicle is travelling on, the control unit is arranged to determine if an imaginary sensor line running a certain distance from the lane marking line has been crossed by the vehicle, and in that case determine that the warning is to be issued by the warning means.

2. The lane-marking crossing warning system according to claim 1, wherein the sensor arrangement is in the form of a camera device.

3. The lane-marking crossing warning system according to claim 1 wherein the control unit is arranged to determine if the vehicle has entered the curve based on if a certain road curvature threshold of the curve has been reached.

4. The lane-marking crossing warning system according to claim 1 wherein when the control unit has determined that the vehicle has entered the curve, the control unit further is arranged to move the sensor line, from coinciding with the lane marking line, to running the certain distance from the lane marking line.

5. The lane-marking crossing warning system according to claim 4, wherein if the control unit has determined that the vehicle has entered the curve of a type turning to the left with regard to the travelling direction of the vehicle, the control unit is arranged to move the sensor line to the left.

6. The lane-marking crossing warning system according to claim 4 wherein if the control unit has determined that the vehicle has entered the curve of a type turning to the right with regard to the travelling direction of the vehicle, the control unit is arranged to move at least one sensor line to the right.

7. The lane-marking crossing warning system according to claim 4 wherein the control unit is arranged to move the sensor line the certain distance in one single step or gradually in several sub-steps.

8. The lane marking crossing warning system according to claim 1 wherein the lane marking line designates a road outer boundary.

9. The lane marking crossing warning system according to claim 1 wherein the lane marking line designates a road lane separation.

10. A method for lane-marking crossing warning in a vehicle, where the method comprises the steps of:

detecting a lane marking line of a lane of a roadway the vehicle is travelling on;

determining if the vehicle is travelling in a curve of the lane of the roadway the vehicle is travelling on; and wherein if the vehicle has been determined to be traveling in the curve, issuing a warning to a vehicle driver if an imaginary sensor line, running a certain distance from the lane marking line of the lane of the roadway the vehicle is travelling on, is crossed by the vehicle.

11. The method according to claim 10, wherein the step of determining if the vehicle is travelling in a curve uses information regarding whether a certain road curvature threshold has been reached.

12. The method according to claim 10 wherein when it has been determined that the vehicle has entered a curve, the sensor line is moved, from coinciding with the lane marking line, to running the certain distance from the lane marking line.

13. The method according to claim 12, wherein when it has been determined that the vehicle has entered a curve of a type turning to the left with regard to a vehicle travelling direction, the sensor line is moved to the left.

14. The method according to claim 12, wherein when it has been determined that the vehicle has entered a curve of the type turning to the right with regard to a vehicle travelling direction, the sensor line is moved to the right.

15. The method according to claim 10 further comprising detecting the lane marking line in the form of a road outer boundary.

* * * * *